(12) United States Patent
Youn et al.

(10) Patent No.: US 11,108,261 B2
(45) Date of Patent: Aug. 31, 2021

(54) SUPPLEMENTARY CHARGING SYSTEM AND METHOD FOR AUXILIARY BATTERY OF ECO-FRIENDLY VEHICLE

(71) Applicants: HYUNDAI MOTOR COMPANY, Seoul (KR); KIA MOTORS CORPORATION, Seoul (KR)

(72) Inventors: Kil Young Youn, Suwon-si (KR); Seung Hyeon Bin, Busan (KR); Sang Kyu Lee, Yongin-si (KR); Jae Hwa Jeon, Hwaseong-si (KR)

(73) Assignees: Hyundai Motor Company, Seoul (KR); KIA Motors Corporation, Seoul (KR)

( * ) Notice: Subject to any disclaimer, the term of this patent is extended or adjusted under 35 U.S.C. 154(b) by 146 days.

(21) Appl. No.: 16/527,851

(22) Filed: Jul. 31, 2019

(65) Prior Publication Data

US 2020/0185943 A1    Jun. 11, 2020

(30) Foreign Application Priority Data

Dec. 6, 2018 (KR) .................. 10-2018-0155918

(51) Int. Cl.
*H02J 7/00* (2006.01)
*B60L 50/50* (2019.01)
(Continued)

(52) U.S. Cl.
CPC ............. *H02J 7/342* (2020.01); *B60L 50/50* (2019.02); *B60L 53/20* (2019.02); *B60L 2210/10* (2013.01)

(58) Field of Classification Search
CPC .... H02J 7/0054; B60L 2210/10; B60L 53/20; B60L 50/50
(Continued)

(56) References Cited

U.S. PATENT DOCUMENTS

| 8,531,053 | B2 * | 9/2013 | Choi et al. | ............... | B60K 6/48 |
| | | | | | 307/9.1 |
| 8,981,729 | B2 * | 3/2015 | Machida | ................. | B60L 53/00 |
| | | | | | 320/138 |

(Continued)

FOREIGN PATENT DOCUMENTS

| JP | 2014-155299 A | 8/2014 |
| JP | 2017-163737 A | 9/2017 |
| KR | 10-1628552 B1 | 6/2016 |

*Primary Examiner* — Sun J Lin (57) ABSTRACT

A supplementary charging system for an auxiliary battery of an eco-friendly vehicle includes: a main battery; an auxiliary battery having a voltage lower than a voltage of the main battery; a low voltage DC-DC converter (LDC) stepping down the voltage of the main battery and providing the stepped-down voltage to the auxiliary battery; and a controller configured to select, when a periodic charge time of the auxiliary battery arrives, either a constant voltage charging method or a constant current charging method as a charging method based on an aging state of the auxiliary battery, and control the LDC to charge the auxiliary battery with a constant voltage or a constant current based on the selected charging method for a predetermined reference time. The controller terminates the charging when a cumulative charge current amount is greater than or equal to a predetermined reference cumulative charge current amount.

9 Claims, 5 Drawing Sheets

(51) Int. Cl.
*B60L 53/20* (2019.01)
*H02J 7/34* (2006.01)

(58) Field of Classification Search
USPC .......................................................... 320/104
See application file for complete search history.

(56) References Cited

U.S. PATENT DOCUMENTS 9,487,090 B2 * 11/2016 Zhang et al. ............. B60L 1/12
10,656,211 B2 * 5/2020 Ha et al. ............... H02J 7/0047

* cited by examiner

SUPPLEMENTARY CHARGING SYSTEM AND METHOD FOR AUXILIARY BATTERY OF ECO-FRIENDLY VEHICLE

CROSS REFERENCE TO RELATED APPLICATION

The present application claims priority to and the benefit of Korean Patent Application No. 10-2018-0155918, filed Dec. 6, 2018, the entire contents of which are incorporated herein by reference.

FIELD

The present disclosure relates to a supplementary charging system and method for an auxiliary battery of an eco-friendly vehicle.

BACKGROUND

The statements in this section merely provide background information related to the present disclosure and may not constitute prior art.

Generally, an eco-friendly vehicle such as an electric vehicle, a hybrid vehicle, a plug-in hybrid vehicle, or a fuel cell vehicle generate a driving force by generating a rotational force of a wheel using an electric motor. The eco-friendly vehicle includes a high-voltage main battery storing electric energy provided to an electric motor for supplying a rotational force to the wheel and a low-voltage auxiliary battery supplying electric power to an electronic/electric load of the vehicle such as a headlight, a wiper, and the like.

In particular, the eco-friendly vehicle includes a low voltage DC-DC converter (LDC) between the main battery and the auxiliary battery to provide startability of the vehicle and durability of the auxiliary battery, and the auxiliary battery is charged by dropping a voltage of the main battery by the LDC and applying the dropped voltage to the auxiliary battery. This supplementary battery charging is called supplementary charging.

In the related art, the auxiliary battery is periodically supplementarily charged when a predetermined time has elapsed, or when power of the auxiliary battery is excessively used by a driver so a state of charge (SOC) of the auxiliary battery drops below a certain level, the auxiliary battery is automatically supplementarily charged.

In particular, in the case of periodic charging in which the auxiliary battery is periodically supplementarily charged, when a predetermined time has lapsed, a controller reads an SOC or a voltage value of the auxiliary battery, and activates the LDC for a certain period of time to charge the auxiliary battery with a constant voltage to maintain the SOC of the auxiliary battery at a predetermined reference SOC or greater.

However, we have discovered that although the charging according to the periodic charging method is performed to reflect the SOC of the auxiliary battery, if capacity of the auxiliary battery itself is reduced due to aging, a sufficient charge current amount cannot be secured even if the auxiliary battery is charged to the reference SOC.

The contents described as the related art have been provided only to assist in understanding the background of the present disclosure and should not be considered as corresponding to the related art known to those having ordinary skill in the art.

SUMMARY

The present disclosure provides a supplementary charging system and a method for an auxiliary battery of an eco-friendly vehicle, which are capable of supplementarily charging an auxiliary battery to secure a minimum cumulative charge current amount desired for operating an eco-friendly vehicle in consideration of an endurable state of the auxiliary battery due to aging.

According to one form of the present disclosure, a supplementary charging system for an auxiliary battery of an eco-friendly vehicle includes: a main battery; an auxiliary battery having a voltage lower than a voltage of the main battery; a low voltage DC-DC converter (LDC) stepping down the voltage of the main battery and providing the stepped-down voltage to the auxiliary battery; and a controller selecting, when a periodic charge time of the auxiliary battery arrives, either a constant voltage charging method or a constant current charging method as a charging method on the basis of an aging state of the auxiliary battery. In particular, the controller is configured to control the LDC to charge the auxiliary battery with a constant voltage for a predetermined reference time when the constant voltage charging method is selected, and configured to control the LDC to charge the auxiliary battery with a constant current for the predetermined reference time when the constant current charging method is selected, and to terminate charging when a cumulative charge current amount provided to the auxiliary battery is greater than or equal to a predetermined reference cumulative charge current amount.

If the auxiliary battery has aged to a level lower than a predetermined level, the controller may charge the auxiliary battery by the constant voltage charging method, and when the auxiliary battery has aged to a level equal to or higher than the predetermined level, the controller may charge the auxiliary battery by the constant current charging method.

After charging the auxiliary battery for the predetermined reference time by the constant voltage charging method, the controller may determine an aging state of the auxiliary battery on the basis of the cumulative charge current amount provided to the auxiliary battery for the predetermined reference time.

After the auxiliary battery is charged for the predetermined reference time by the constant voltage charging method, if the cumulative charge current amount provided to the auxiliary battery for the predetermined reference time is smaller than or equal to the predetermined reference cumulative charge current amount, the controller may determine that the auxiliary battery has aged to a level higher than the predetermined level and charge the auxiliary battery by the constant current method at the periodic charge time that subsequently comes.

The controller may determine the predetermined reference cumulative charge current amount on the basis of a target cumulative charge current amount corresponding to a difference between a state of charge (SOC) of the auxiliary battery when the periodic charge time arrives and a predetermined target SOC.

The controller may determine a percentage corresponding to a difference between the SOC of the auxiliary battery when the periodic charge time arrives on the basis of a rated capacity of the auxiliary battery and the predetermined target SOC, as the target cumulative charge current amount, and determine a predetermined percentage of the target cumulative charge current amount as the predetermined reference cumulative charge current amount.

According to another form of the present disclosure, a supplementary charging method for an auxiliary battery of an eco-friendly vehicle including a main battery, an auxiliary battery having a voltage lower than a voltage of the main battery, and a low voltage DC-DC converter (LDC) stepping down the voltage of the main battery and providing the stepped-down voltage to the auxiliary battery, includes: when a periodic charge time arrives, determining, by a controller, a reference cumulative charge current amount on the basis of a target cumulative charge current amount corresponding to a difference between a state of charge (SOC) of the auxiliary battery and a predetermined target SOC; selecting, by the controller, either a constant voltage charging method or a constant current charging method as a charging method on the basis of an aging state of the auxiliary battery; when the constant voltage charging method is selected in the selecting operation, controlling, by the controller, the LDC to charge the auxiliary battery with a constant voltage for a predetermined reference time; when the constant current charging method is selected in the selecting operation, controlling, by the controller, the LDC to charge the auxiliary battery with a constant current for the predetermined reference time; and when a cumulative charge current amount provided to the auxiliary battery is greater than or equal to a predetermined reference cumulative charge current amount after the constant-current charging operation, terminating charging by the controller.

The determining the reference cumulative charge current amount includes: calculating a percentage corresponding to the difference between the predetermined target SOC and the SOC of the auxiliary battery based on a rated capacity of the auxiliary battery; determining the calculated percentage as the target cumulative charge current amount; and, and determining a predetermined percentage of the target cumulative charge current amount as the reference cumulative charge current amount.

The supplementary charging method may further include: if the cumulative charge current amount provided to the auxiliary battery for the predetermined reference time is smaller than or equal to the predetermined reference cumulative charge current amount, determining that the auxiliary battery has aged to a level higher than a predetermined level; and when the next periodic charge time arrives, charging the auxiliary battery by the constant current charging method.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
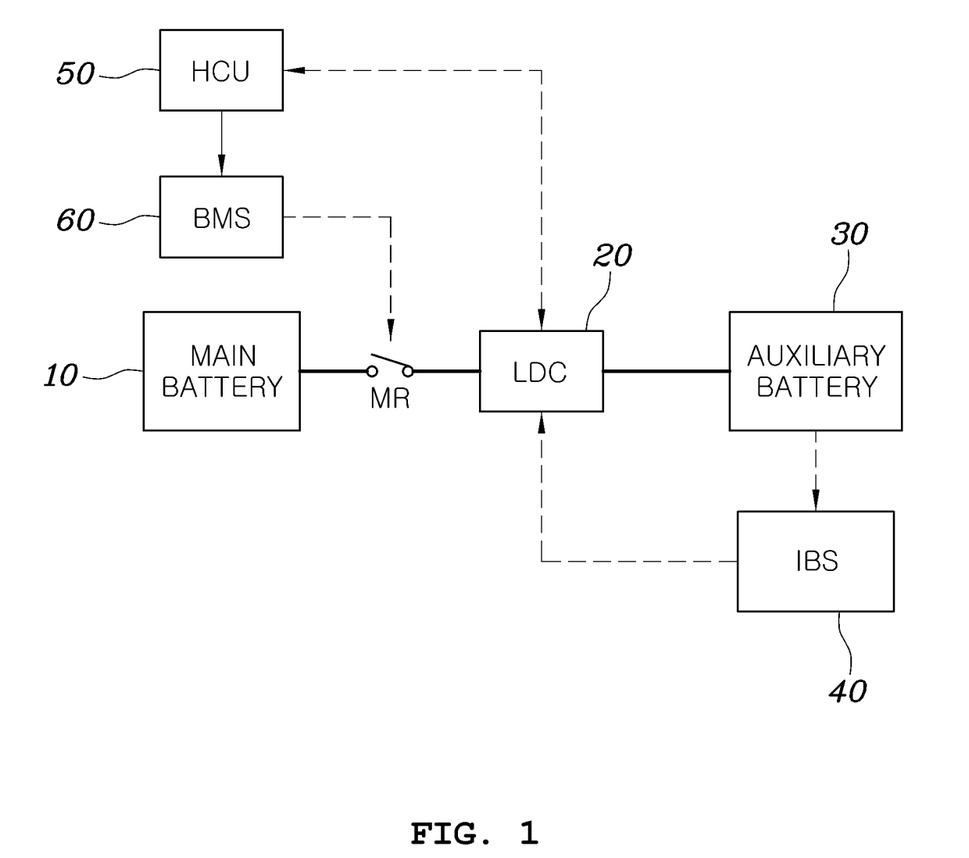
FIG. 1 is a block diagram illustrating a supplementary charging system for an auxiliary battery of an eco-friendly vehicle.

FIG. 1 is a block diagram illustrating a supplementary charging system for an auxiliary battery of an eco-friendly vehicle according to an exemplary form of the present disclosure.

Referring to FIG. 1, the supplementary charging system for an auxiliary battery of an eco-friendly vehicle includes: a main battery 10, an auxiliary battery 30 having a voltage lower than that of the main battery 10, and a low voltage DC-DC converter (LDC) 20 for dropping the voltage of the main battery 10 and providing the same to the auxiliary battery 30.

The supplementary charging system for an auxiliary battery of an eco-friendly vehicle in one form of the present disclosure may further include an intelligent battery sensor (IBS) 40, a hybrid control unit (HCU) 50, and a battery management system (BMS) 60, as a sensor or a controller for detecting a voltage and a current of the auxiliary battery 30 and appropriately controlling the LDC 20 to provide a voltage of the main battery 10 to the auxiliary battery 30 to periodically supplementarily charge the auxiliary battery 30.

Since the IBS 40, the HCU 50, and the BMS 60 are components already commonly used in the hybrid vehicle technical field and applications and functions thereof are well known in the art, a detailed description thereof will be omitted. Also, although a separate specific description is omitted, it may be understood that detecting a voltage and a current of the auxiliary battery 30 is performed by the IBS 40, and a person skilled in the art may also easily understand that a control operation or calculation for realizing various forms of the present disclosure is performed by a processor, a memory, and the like, provided in the LDC 20, the IBS 40, the HCU 50, and the BMS 60. The processor and the memory provided in the LDC 20, the IBS 40, the HCU 50, and the BMS 60 that perform a control operation and calculation may collectively be referred to as a controller.

Figure 2:
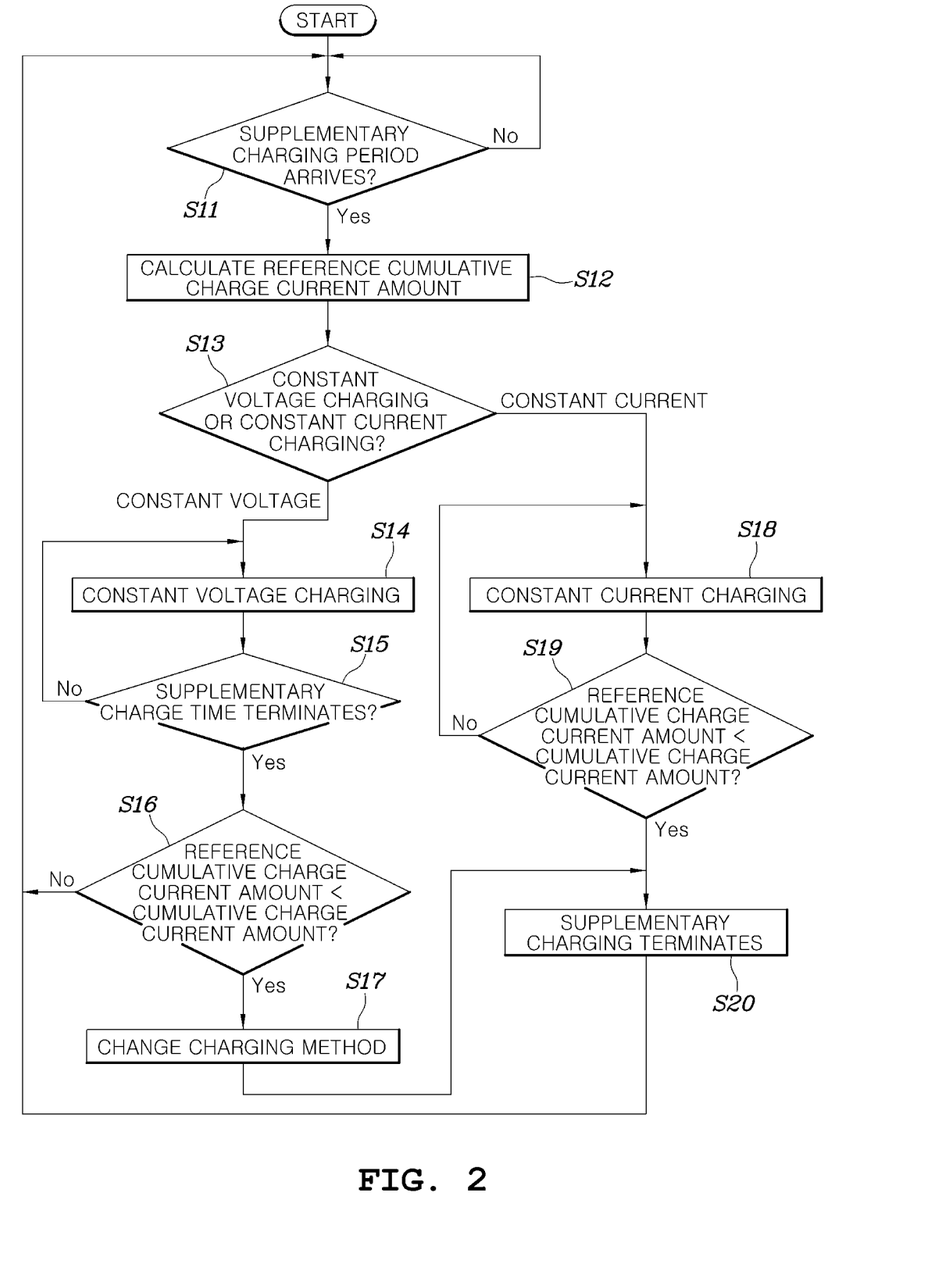
FIG. 2 is a flowchart illustrating a supplementary charging method for an auxiliary battery of an eco-friendly vehicle.

FIG. 2 is a flowchart illustrating a supplementary charging method for an auxiliary battery of an eco-friendly vehicle in one form of the present disclosure. The supplementary charging method for an auxiliary battery of an eco-friendly vehicle illustrated in FIG. 2 is realized by a supplementary charging system for an auxiliary battery of an eco-friendly vehicle as illustrated in FIG. 1. The operation of the supplementary charging system for an auxiliary battery of an eco-friendly vehicle may be clearly understood through the description of the supplementary charging method for an auxiliary battery of an eco-friendly vehicle according to the forms of the present disclosure.

Referring to FIGS. 1 and 2, the supplementary charging method for an auxiliary battery of an eco-friendly vehicle may start from an operation (S11) of determining, by the HCU 50, whether a time for starting periodic charging has arrived according to a predetermined supplementary charging period.

If it is determined that the periodic charging time arrives in operation S11, the HCU 50 may wake up a related controller (e.g., a controller of the IBS 40, LDC 20, or BMS 60) used for supplementary charging. The awakened LCD 20 may determine whether supplementary charging is desired on the basis of a result of detecting a voltage or a current of the auxiliary battery 30 detected by the IBS 40 or a state of charge (SOC) of the auxiliary battery 30 calculated by the IBS 40, and transfer the determination to the HCU 50.

If it is determined that supplementary charging is to be performed in operation S11, the HCU 50 may instruct the BMS 60 to turn on a main relay provided between the main battery 10 and the LDC 20 and calculate a reference cumulative charge current amount in operation S12.

Figure 3:
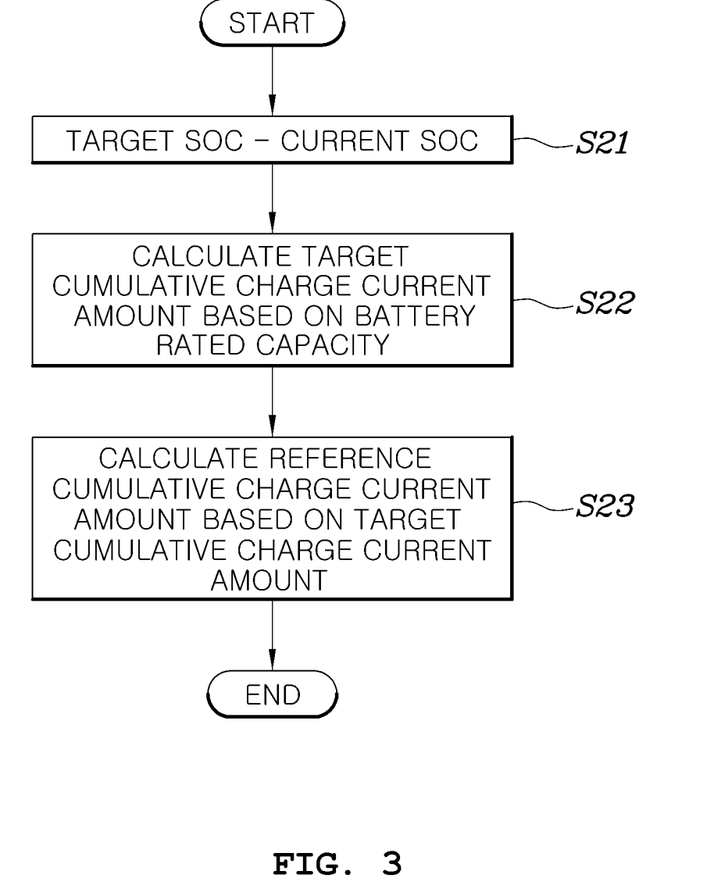
FIG. 3 is a flowchart illustrating an operation of calculating a reference cumulative charge current amount of a supplementary charging method for an auxiliary battery of an eco-friendly vehicle.

The reference cumulative charge current amount refers to a cumulative charge amount to be charged at the least on the basis of the current state of the auxiliary battery 30 to provide startability of the vehicle, or the like, when supplementary charging is performed, which is illustrated in more detail in FIG. 3.

FIG. 3 is a flowchart illustrating an operation of calculating a reference cumulative charge current amount of a supplementary charging method for an auxiliary battery of an eco-friendly vehicle according to another form of the present disclosure.

Operation S12 of calculating the reference cumulative charge current amount may include operation S21 of calculating a difference between a predetermined target state of charge (SOC) and an SOC of the auxiliary battery 30 at the time when the periodic charge time has arrived, operation S22 of determining a percentage corresponding to a difference between the target SOC and the SOC of the auxiliary battery 30 based on rated capacity of the auxiliary battery 30, as a target cumulative charge current amount, and operation S23 of determining a predetermined percentage of the target cumulative charge current amount, as a reference cumulative charge current amount.

In operation S21, the LDC 20 receives the target SOC of the auxiliary battery 30 from the HCU 50 at a start time of periodic charging and receives the current SOC of the auxiliary battery 30 from the IBS 40 and compares the both SOCs. For example, when the target SOC is 85% and the current SOC is 75%, the LDC 20 calculates a difference between the two values to calculate an SOC increase requirement of 10%.

Subsequently, in operation S22, the LDC 20 calculates a target cumulative charge current amount on the basis of a rated capacity of the battery, i.e., a maximum capacity at which the battery is normally operable in terms of specification of the battery, and the value corresponding to the difference between the calculated target SOC and the current SOC calculated in operation S21. For example, assuming that the rated capacity of the battery is 50 Ah, the LDC 20 may calculate 5 Ah corresponding to 10% of the rated capacity (i.e., the value corresponding to the difference between the target SOC and the current SOC calculated in operation S21), as the target cumulative charge current amount.

Thereafter, in operation S23, the LDC 20 may calculate a reference cumulative charge current amount by applying a predetermined percentage to the target cumulative charge current amount. For example, the LDC 20 may determine 4 Ah as the reference cumulative charge current amount by applying predetermined 80% to 5 Ah, i.e., the target cumulative charge current amount calculated in operation S21. The percentage applied in operation S23 may be appropriately adjusted according to a vehicle state, the battery state, etc., and when the percentage is a maximum of 100%, the target cumulative charge current amount may be equal to the reference cumulative charge current amount.

Referring back to FIG. 2, when the reference cumulative charge current amount is determined, the LDC 20 may select a charge method used for charging in operation S13. In operation S13, the LDC 20 may determine either a constant voltage charging method or a constant current charging method as a supplementary charging method.

The constant voltage charging method is a method of charging by uniformly maintaining, by the LDC 20, a charge voltage applied to the auxiliary battery 30, and here, a charge current is reduced as charging progresses. The constant current charging method is a method of charging by uniformly maintaining, by the LDC 20, a charge current provided to the auxiliary battery 30, and here, a voltage must be increased as charging progresses.

In case where the constant voltage charging method is applied in a state in which internal resistance of the battery is increased due to aging of the battery, a voltage portion due to the internal resistance of the battery is applied to a terminal of the battery. Then, charging may be terminated in a state in which a sufficient charge current amount is not actually provided to the battery due to the increase in the voltage of the terminal of the battery.

Therefore, in various forms of the present disclosure, in case where the battery has not been aged to a certain level or higher, the constant voltage charging method available for charging within a short period of time is applied, and in case where the battery has aged to a level higher than the certain level so a sufficient charge current cannot be supplied to the battery according to constant voltage charging, the constant current charging method is applied.

If the battery has not been aged to the certain level, the LDC 20 performs charging by the constant voltage charging method with the auxiliary battery 30 in operation S14. The constant voltage charging may continue to perform until it is determined that a predetermined reference supplementary charge time has expired in operation S15. The predetermined reference supplementary charge time may be previously set according to the target SOC or determined by calculation according to the target SOC.

When charging the auxiliary battery 30 based on the constant voltage charging method is completed, the LDC 20 compares the cumulative charge current amount supplied to the auxiliary battery 30 for the reference supplementary time with the reference cumulative charge current amount calculated in operation S12, in operation S16. If the cumulative charge current amount provided to the auxiliary battery 30 for the reference supplementary time is smaller than the reference cumulative charge current amount calculated in operation S12, the LDC 30 may determine that the auxiliary battery 30 has aged to a level equal to or higher than a predetermined level and change the charging method so that constant current charging is performed thereafter in operation S17.

The cumulative charge current amount provided to the auxiliary battery 30 for the reference supplementary time may be detected by the IBS 40 and provided to the LDC 20.

If the auxiliary battery 30 has not aged, when charging is performed for a predetermined charge time by the constant voltage charging method, a sufficient charge current may be provided to the auxiliary battery. However, if the auxiliary battery 30 has aged so internal resistance increases, the extent occupied by a voltage applied to the internal resistance in a terminal voltage of the auxiliary battery 30 is increased, and thus, a sufficient current cannot be provided until the terminal voltage of the auxiliary battery 30 reaches a charge voltage of the LDC 20.

In various forms of the present disclosure, after the constant voltage charging is completed, if the cumulative charge current amount provided to the auxiliary battery 30 during the constant voltage charging is smaller than or equal to the reference cumulative charge current amount calculated on the basis of the target SOC, charging is performed by the constant current charging method at periodic charging thereafter.

In order to determine the charging method, the LDC 20 may have a bit for indicating the battery charging method. This bit may be initially set to '0'. The LDC 20 may check the bit to determine the charging method. If the value is '0', the constant voltage charging method may be applied. If it is determined that the cumulative charge current amount provided to the auxiliary battery 30 during the constant voltage charging in operation S16 is smaller than or equal to the reference cumulative charge current amount, the LCD 20 sets the bit to '1' in operation S17. Thereafter, a time for starting the periodic charging arrives, the LDC 20 may determine that the corresponding bit is '1' and apply the constant current charging method.

If it is determined to apply the constant current charging method in operation S13, the LDC 20 performs constant current charging to provide a predetermined current to the auxiliary battery 30 in operation S18. The LDC compares the cumulative charge current amount provided to the auxiliary battery 30 with the reference cumulative charge current amount calculated in operation S12, in operation S19. If the former is greater than or equal to the latter, the LDC 20 terminates the supplementary charging in operation S20.

Figure 4:
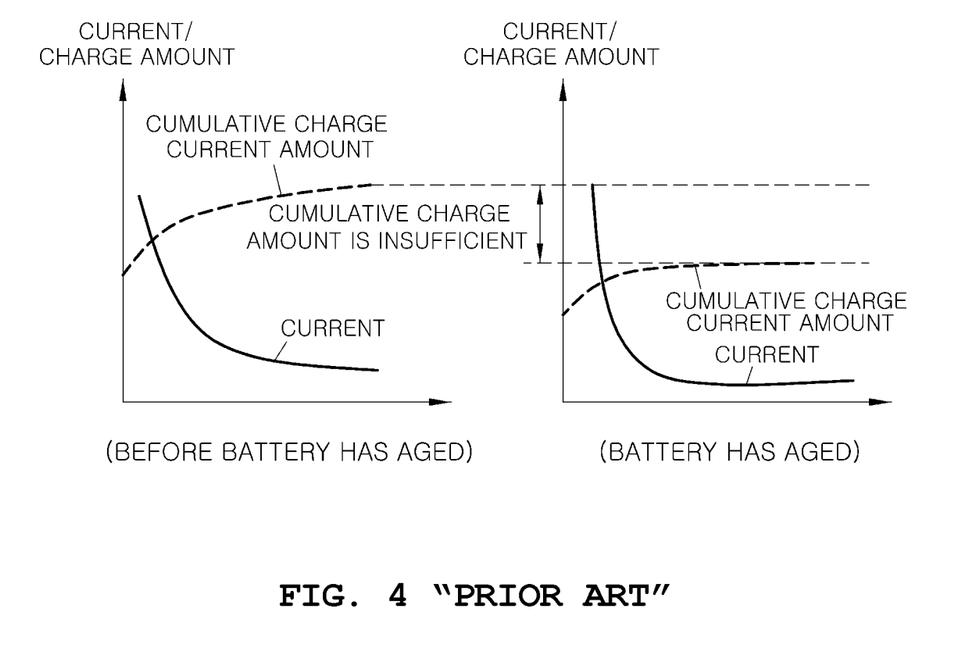
FIG. 4 is graphs comparing battery charge states before and after aging according to the related art supplementary charging method for an auxiliary battery.
Figure 5:
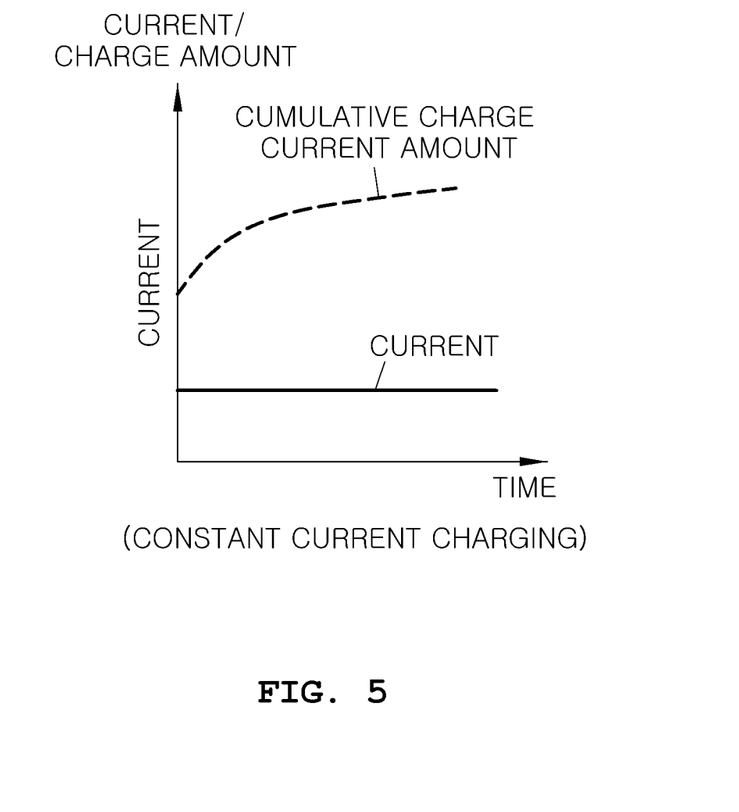
FIG. 5 is a graph comparing battery charge states before and after aging according to a supplementary charging system and method for an auxiliary battery of an eco-friendly vehicle.

FIG. 4 is graphs comparing battery charge states before and after aging according to the related art supplementary charging method for an auxiliary battery, and FIG. 5 is a graph comparing charge states of an aged battery according to a supplementary charging system and method for an auxiliary battery of an eco-friendly vehicle according to an exemplary form of the present disclosure.

As illustrated in FIG. 4, in the related art, the auxiliary battery 30 is supplementarily charged using only the constant voltage charging method. In this case, if the auxiliary battery 20 has not aged, the cumulative charge current amount may be sufficiently supplied to the auxiliary battery 20 through constant voltage charging. However, in the case of an aged auxiliary battery 20, a terminal voltage of the auxiliary battery 20 is very quickly increased to rapidly reduce a supplied current, resulting in a shortage of the cumulative charge current amount.

In contrast, as illustrated in FIG. 5, in various forms of the present disclosure, in case where the auxiliary battery 20 has aged, a constant current may be supplied to supplementarily charge the auxiliary battery 20, and thus, a desired cumulative charge current amount of the auxiliary battery 20 may be secured. Thus, in various forms of the present disclosure, although the auxiliary battery 20 has aged, an appropriate level of charge amount desired for operating the vehicle, such as providing vehicle startability, or the like, may be maintained.

According to the supplementary charging system and method for an auxiliary battery of an eco-friendly vehicle, it is possible to determine a charging method in consideration of an aging state of the auxiliary battery of the eco-friendly vehicle when the auxiliary battery is supplementarily charged periodically.

That is, according to the supplementary charging system and method for an auxiliary battery of an eco-friendly vehicle, when the auxiliary battery has not aged, the auxiliary battery is charged for a predetermined time by the constant voltage charging method, whereby the auxiliary battery can be sufficiently charged, and when the auxiliary battery has aged to a level equal to or higher than a predetermined level, the auxiliary battery is charged by the constant current charging method, and here, the cumulative charge current amount of the auxiliary battery is controlled to be greater than the predetermined reference cumulative charge current amount, whereby even the aged auxiliary battery may be charged to an appropriate level desired for operating the vehicle.

Therefore, according to the supplementary charging system and method for an auxiliary battery of an eco-friendly vehicle, shortage of the cumulative charge current when the auxiliary battery is supplementarily charged only for a predetermined time according to the periodic charging method without consideration of aging of the auxiliary battery may be resolved, and thus, even in the case of the vehicle equipped with the aged auxiliary battery, startability thereof may be firmly secured.

Although the present disclosure has been shown and described with respect to specific forms, it will be apparent to those having ordinary skill in the art that the present disclosure may be variously modified and altered without departing from the spirit and scope of the present disclosure.

What is claimed is:

1. A supplementary charging system for an auxiliary battery of an eco-friendly vehicle, the supplementary charging system comprising:
 a main battery;
 an auxiliary battery having a voltage lower than a voltage of the main battery;
 a low voltage DC-DC converter (LDC) configured to step down the voltage of the main battery and to provide the stepped-down voltage to the auxiliary battery; and
 a controller configured to:
  when a periodic charge time of the auxiliary battery arrives, select either a constant voltage charging method or a constant current charging method as a charging method based on an aging state of the auxiliary battery,
  control the LDC to charge the auxiliary battery with a constant voltage for a predetermined reference time when the constant voltage charging method is selected,
  control the LDC to charge the auxiliary battery with a constant current for the predetermined reference time when the constant current charging method is selected, and
  terminate charging when a cumulative charge current amount provided to the auxiliary battery is greater than or equal to a predetermined reference cumulative charge current amount.

2. The supplementary charging system of claim 1, wherein
 when the auxiliary battery has aged to a level lower than a predetermined level, the controller is configured to charge the auxiliary battery by the constant voltage charging method, and
 wherein when the auxiliary battery has aged to a level equal to or greater than the predetermined level, the controller is configured to charge the auxiliary battery by the constant current charging method.

3. The supplementary charging system of claim 1, wherein
 after charging the auxiliary battery for the predetermined reference time by the constant voltage charging method, the controller is configured to determine the aging state of the auxiliary battery based on the cumulative charge current amount provided to the auxiliary battery for the predetermined reference time.

4. The supplementary charging system of claim 2, wherein after the auxiliary battery is charged for the predetermined reference time by the constant voltage charging method, when the cumulative charge current amount provided to the auxiliary battery for the predetermined reference time is less than or equal to the predetermined reference cumulative charge current amount, the controller is configured to determine that the auxiliary battery has aged to a level higher than the predetermined level and to charge the auxiliary battery by the constant current charging method at the periodic charge time that subsequently comes.

5. The supplementary charging system of claim 4, wherein the controller is configured to determine the predetermined reference cumulative charge current amount based on a target cumulative charge current amount corresponding to a difference between a state of charge (SOC) of the auxiliary battery and a predetermined target SOC, when the periodic charge time arrives.

6. The supplementary charging system of claim 5, wherein the controller is configured to determine a percentage corresponding to a difference between the SOC of the auxiliary battery when the periodic charge time arrives based on a rated capacity of the auxiliary battery and the predetermined target SOC, as the target cumulative charge current amount, and configured to determine a predetermined percentage of the target cumulative charge current amount as the predetermined reference cumulative charge current amount.

7. A supplementary charging method for an auxiliary battery of an eco-friendly vehicle including a main battery, an auxiliary battery having a voltage lower than a voltage of the main battery, and a low voltage DC-DC converter (LDC) stepping down the voltage of the main battery and providing the stepped-down voltage to the auxiliary battery, the supplementary charging method comprising:

when a periodic charge time arrives, determining, by a controller, a reference cumulative charge current amount based on a target cumulative charge current amount corresponding to a difference between a state of charge (SOC) of the auxiliary battery and a predetermined target SOC;

selecting, by the controller, either a constant voltage charging method or a constant current charging method as a charging method based on an aging state of the auxiliary battery;

when the constant voltage charging method is selected, controlling, by the controller, the LDC to charge the auxiliary battery with a constant voltage for a predetermined reference time;

when the constant current charging method is selected, controlling, by the controller, the LDC to charge the auxiliary battery with a constant current for the predetermined reference time; and when a cumulative charge current amount provided to the auxiliary battery is greater than or equal to the reference cumulative charge current amount after operating a charging using the constant-current charging method, terminating the charging by the controller.

8. The supplementary charging method of claim 7, wherein the determining the reference cumulative charge current amount comprises:

calculating a percentage corresponding to the difference between the predetermined target SOC and the SOC of the auxiliary battery based on a rated capacity of the auxiliary battery and determining the calculated percentage as the target cumulative charge current amount; and determining a predetermined percentage of the target cumulative charge current amount as the reference cumulative charge current amount.

9. The supplementary charging method of claim 7, further comprising:

when the cumulative charge current amount provided to the auxiliary battery for the predetermined reference time is less than or equal to the reference cumulative charge current amount determined previously, determining that the auxiliary battery has aged to a level higher than a predetermined level; and when a next periodic charge time arrives, charging the auxiliary battery by the constant current charging method.

* * * * *